(12) United States Patent
Park

(10) Patent No.: US 6,327,018 B1
(45) Date of Patent: *Dec. 4, 2001

(54) METHOD FOR MANUFACTURING A LIQUID CRYSTAL DISPLAY BY USING NON-RUBBING METHOD ON POLYIMIDE ORIENTATION FILM

(75) Inventor: Ho-young Park, Pusan (KR)

(73) Assignee: Samsung Display Device Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,801

(22) Filed: Dec. 24, 1997

(30) Foreign Application Priority Data

Dec. 30, 1996 (KR) .................................... 96-76953

(51) Int. Cl.[7] .......................... G02F 1/13; G02F 1/1337; C09K 19/00
(52) U.S. Cl. ......................... 349/187; 349/123; 349/191; 428/1.26
(58) Field of Search .................................... 349/187, 123, 349/136, 191; 428/1.1, 1.2, 1.26

(56) References Cited

U.S. PATENT DOCUMENTS

| | | | | |
|---|---|---|---|---|
| 5,073,294 | * | 12/1991 | Shannon et al. | 252/299.01 |
| 5,186,985 | * | 2/1993 | Estes et al. | 349/123 |
| 5,464,669 | * | 11/1995 | Kang et al. | 428/1 |
| 5,498,762 | * | 3/1996 | Eguchi | 349/123 |
| 5,518,782 | * | 5/1996 | Takao et al. | 349/123 |
| 5,607,732 | * | 3/1997 | Miyamoto et al. | 428/1 |
| 5,623,354 | * | 4/1997 | Lien et al. | 349/124 |
| 5,653,845 | * | 8/1997 | Kawata | 156/344 |
| 5,764,326 | * | 6/1998 | Hasegawa et al. | 349/124 |
| 5,817,743 | * | 10/1998 | Gibbons et al. | 528/353 |
| 5,824,377 | * | 10/1998 | Pirwitz et al. | 428/1 |
| 5,991,001 | * | 11/1999 | Park | 349/191 |

FOREIGN PATENT DOCUMENTS

| | | |
|---|---|---|
| 4-12322 | 1/1992 | (JP) . |
| 5-53118 | 3/1993 | (JP) . |
| 10-123531 | 5/1998 | (JP) . |

OTHER PUBLICATIONS

Toko et al, TN–LCDs Fabricated by Non–Rubbing showing Wide and Homogeneous Viewing Angular Characteristics and Excellent Voltage, SID 93 Digest, pp. 622–625, 1993.*

* cited by examiner

*Primary Examiner*—William L. Sikes
*Assistant Examiner*—Tarifur R. Chowdhury
(74) *Attorney, Agent, or Firm*—Leydig, Voit & Mayer, Ltd.

(57) ABSTRACT

A liquid crystal display and a method for manufacturing the same are provided. An orientation film orientation-processed by a non-rubbing method using a polymer is formed on the respective opposing surfaces of first and second substrates. The first and second substrates on which the orientation films are formed are sealed to form a space, and then liquid crystal is injected into the space. A liquid crystal cell into which the liquid crystal has been injected is heated, and an ultraviolet ray of a predetermined wavelength is irradiated on the liquid crystal cell for a predetermined period of time, thereby forming the liquid crystal display. Thus, the pretilt angle can be increased.

9 Claims, 2 Drawing Sheets

METHOD FOR MANUFACTURING A LIQUID CRYSTAL DISPLAY BY USING NON-RUBBING METHOD ON POLYIMIDE ORIENTATION FILM

BACKGROUND OF THE INVENTION

1. Field of the Invention

The present invention relates to method for manufacturing a liquid crystal display which includes a process of forming an orientation film for aligning liquid crystal material and a process of treating the liquid crystal, and a liquid crystal display manufactured by the method.

2. Description of Related Art

A conventional liquid crystal display can be produced in various sizes ranging from a subminiature size to a large size and diverse display patterns can be achieved. Liquid crystal displays have been widely applied to display devices. FIG. 1 shows an example of a liquid crystal display having a liquid crystal having a twist angle between 180° and 270°. As shown in FIG. 1, first and second transparent electrodes 13 and 14 are isolated from each other in parallel stripes and cross each other. The first and second electrodes 13 and 14 are located on the opposing surfaces of first and second transparent substrates 11 and 12, respectively. Orientation films 16 and 17 cover the transparent electrodes 13 and 14, respectively. Liquid crystal material 19 is injected between the orientation films 16 and 17, and the resultant structure is sealed by a sealant 18. Polarizing plates 21 and 22 are attached to the outer surfaces of the first and second transparent substrates 11 and 12, respectively, and the polarization directions of the polarizing plates 21 and 22 correspond to the twist angle of the liquid crystal 19.

The surfaces of the orientation films 16 and 17 are treated to orient the liquid crystal 19 in a predetermined direction. Here, treatment of the orientation films is an important factor in determining the pretilt angle of the orientation films. Preferably, the pretilt angle is large for an effective picture display.

Examples of orientation film treatment methods include: a rubbing method for rubbing the orientation films 16 and 17 in a predetermined direction using a cloth, a non-rubbing method including an SiO inclined angle deposition method, a figure transcription method and a light irradiation method using high-polymerization of light due to ultraviolet radiation. The rubbing method causes phase distortion and light dispersion since it is difficult to form fine and accurate orientation grooves on the orientation film. In particular, since the pretilt angle of the orientation film depends on the rubbing pressure, the rubbing pressure must be increased to obtain a large pretilt angle, and it is also difficult to obtain a uniform pretilt angle over the entire orientation film.

The light irradiation method, as an orientation treatment method performed by exposure to light and development of a photosensitive film coating the upper surface of the orientation film, can arbitrarily control the direction of orientation. However, in this type of non-rubbing method, there is a limit in improving the resolution of the picture since the orienting force is weak and the pretilt angle is not relatively large.

For example, a pretilt angle of 4 to 6° is obtained by orienting polyimide (a high polymer compound) using the non-rubbing method. This pretilt angle is not within the normally acceptable range between 8° and 10°. Therefore, a reversely twisted domain where liquid crystal molecules are reversely twisted may be generated.

In order to solve the above problem, as disclosed in U.S. Pat. No. 5,464,669 issued to Kang et al. on Nov. 7, 1995, a method for forming a polyvinyl-4-fluorocinnamate (PVCN-F) film respectively on two opposing substrates and irradiating linearly-polarized UV rays having different energies on the respective PVCN-F films has been developed.

However, the PVCN-F polymer is relatively expensive, and since the pretilt angle depends on the difference in energies of linearly-polarized light, it is difficult to control the amount of light irradiation.

SUMMARY OF THE INVENTION

To solve the above-described problem, it is an object of the present invention to provide a method for manufacturing a liquid crystal display by which the pretilt angle of an orientation film can be increased, and a liquid crystal display manufactured by the above manufacturing method.

To accomplish the above object, there is provided a method for manufacturing a liquid crystal display, the method comprising the steps of: (a) coating an orientation film on the respective opposing surfaces of first and second transparent substrates; (b) orientation-processing the orientation films using a non-rubbing method; (c) injecting and sealing liquid crystal between the orientation films to thereby produce a liquid crystal cell; (d) heating the liquid crystal cell to a predetermined temperature; and (e) irradiating an ultraviolet ray on the liquid crystal cell.

Here, it is preferable that the temperature for heating the liquid crystal cell is between 90° C. and 180° C.

Also, preferably, the wavelength of the ultraviolet radiation is between 200 nm and 250 nm and the thickness of the orientation film is between 350 Å and 700 Å.

According to another aspect of the present invention, a liquid crystal display manufactured by the above method is provided.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
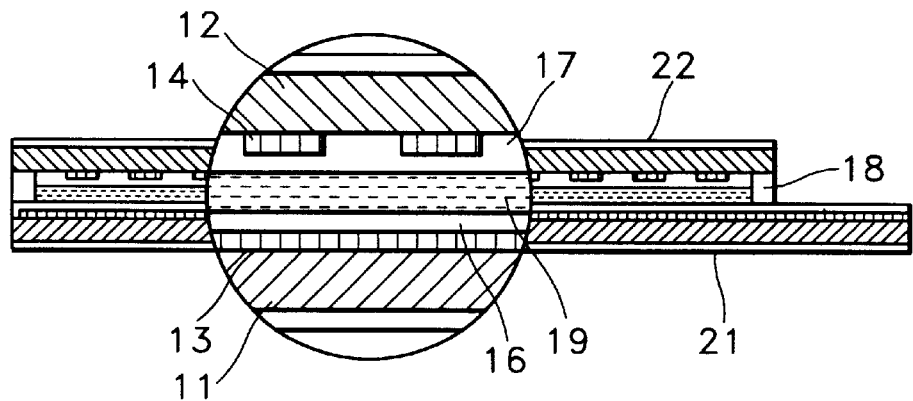
FIG. 1 is a sectional view of a general liquid crystal display in which a portion thereof has been magnified.

A liquid crystal display manufacturing method according to the present invention will be described referring to FIG. 1 showing the configuration of a typical liquid crystal display.

First and second transparent electrodes 13 and 14 each having a predetermined pattern are formed on the opposing surfaces of first and second transparent substrates 11 and 12 which have been thoroughly cleaned. Orientation films 16 and 17 are applied to opposing surfaces of the first and second transparent substrates 11 and 12 on which the transparent electrodes 13 and 14 are formed, using polyimide having a long-chain alkyl group. A typical well-known material can be used as the polyimide. The thickness of the orientation film is between 300 Å and 1000 Å, preferably, between 350 Å and 700 Å. Also, preferably, the plastic temperature of the orientation film is between 150° C. and 200° C. Furthermore, the orientation films 16 and 17 are orientation-treated by a non-rubbing method including the aforementioned light irradiation method and the shape transcription method.

After the orientation films 16 and 17 are completely formed, liquid crystal material is injected between the orientation films 16 and 17, and the resultant structure is sealed at the edges by a sealant 18.

Then, a process for increasing the pretilt angle is performed as follows. That is, the liquid crystal cell into which liquid crystal has been injected is heated at to a predetermined temperature. Here, it is preferable that the heating temperature is between 90° C. and 180° C., with the optimal temperature being between 100° C. and 120° C. When the heating temperature is lower than 90° C., irradiation with ultraviolet radiation (to be described later) does not have a significant effect on increasing the pretilt angle. When the heating temperature is greater than 180° C., the liquid crystal material may be damaged.

Thereafter, the heated cell is irradiated with ultraviolet radiation. Here, it is preferable that the wavelength of the ultraviolet ray is between 200 nm and 500 nm, and that the duration irradiation is between approximately 6 minutes and 15 minutes. In particular, the optimal wavelength of the ultraviolet light is between 300 nm and 440 nm to increase the pretilt angle. If the wavelength of the ultraviolet light is not between 200 nm and 500 nm, any increase in the pretilt angle will be minimal.

According to the present invention, the heating of the liquid crystal cell can be simultaneously performed with irradiation using ultraviolet radiation.

The effects of the present invention can be more clearly shown through the following experimental example.

EXPERIMENTAL EXAMPLE

In this experiment, PVC1 from Aldrich Chemical CO. was used as the material for the orientation film, the plastic temperature and the thickness of the orientation film were about 200° C. and 400 Å, respectively, and the twist angle of liquid crystal material used was 260°.

Figure 2:
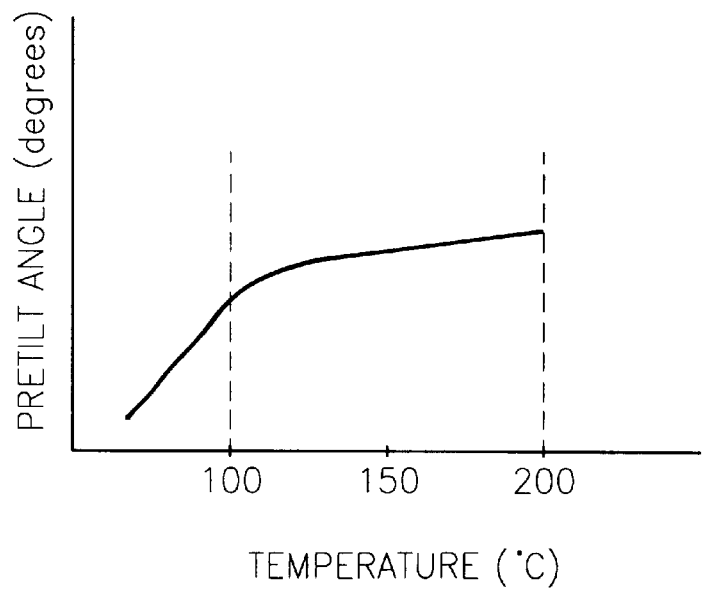
FIG. 2 is a graph showing variations in the pretilt angle according to the heating temperature of a liquid crystal cell according to the present invention.

FIG. 2 shows variations in the pretilt angle according to the heating temperature of the liquid crystal cell. The wavelength of the irradiated ultraviolet ray was about 350 nm, and the irradiation time was about 12 minutes. As shown in FIG. 2, when the heating temperature of the liquid crystal cell was lower than 90° C., the increase in pretilt angle was minimal.

Figure 3:
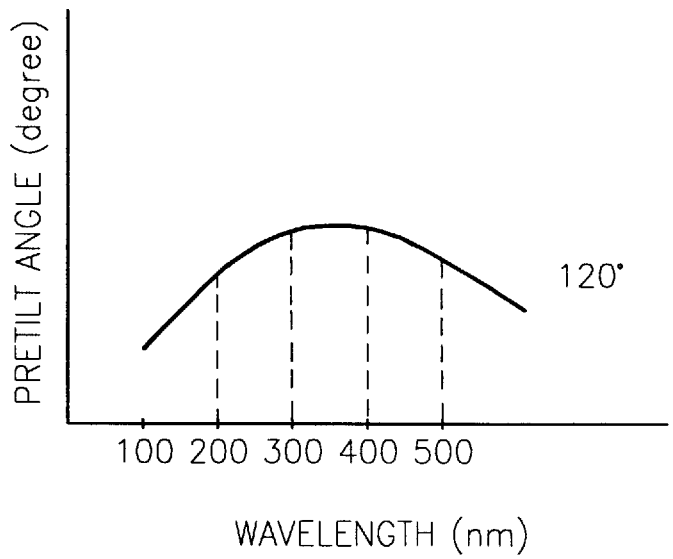
FIG. 3 is a graph showing variations in the pretilt angle according to the wavelength of an ultraviolet ray irradiated on an orientation film according to the present invention.

FIG. 3 shows the pretilt angle depending on the wavelength of the ultraviolet radiation used to irradiate the liquid crystal cell. The duration of irradiation was 12 minutes, and the temperature for heating the liquid crystal cell was 120° C. As shown in FIG. 3, the pretilt angle increased significantly when using ultraviolet radiation having a wavelength between 200 nm and 500 nm.

Figure 4:
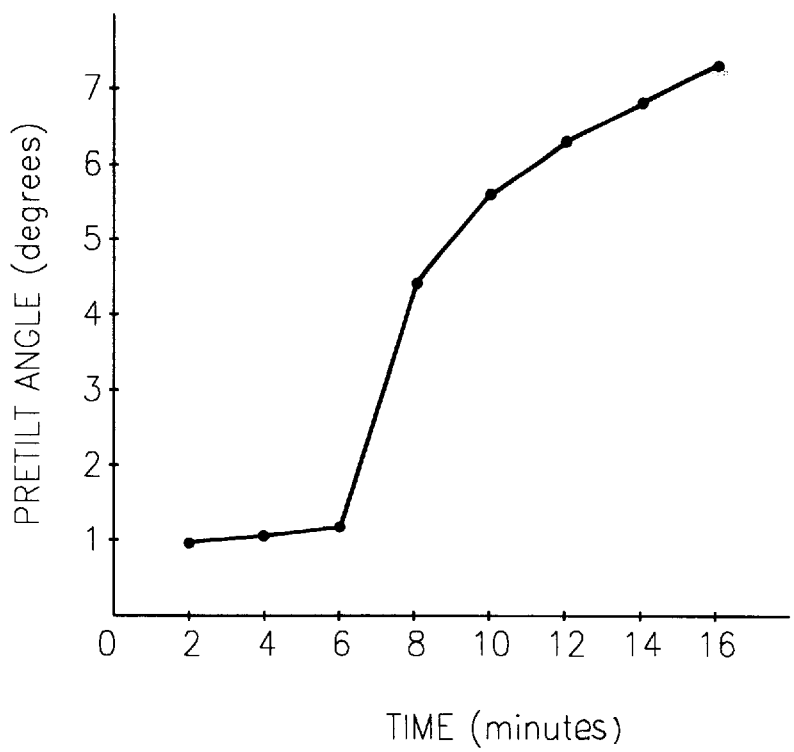
FIG. 4 is a graph showing variations in the pretilt angle according to the irradiation time of an ultraviolet ray irradiated on an orientation film according to the present invention.

FIG. 4 shows variations in the pretilt angle according to the irradiation time of the ultraviolet light irradiation of the liquid crystal cell. The temperature for heating the liquid crystal cell was 120° C., and the wavelength of the ultraviolet radiation was 350 nm. As shown in FIG. 4, it was evident that the preferred time for irradiation with the ultraviolet radiation was between 6 minutes and 15 minutes.

What is claimed is:

1. A method for manufacturing a liquid crystal display, said method comprising, sequentially:

applying a polyimide orientation film having a thickness within a range from 30 to 100 nm on respective opposing surfaces of each of first and second transparent substrates;

orientation-processing said polyimide orientation films using a non-rubbing method;

injecting and sealing a liquid crystal material between said polyimide orientation films to produce a liquid crystal cell;

heating said liquid crystal cell to a temperature within a range from 90° to 180° C.; and irradiating said liquid crystal cell with ultraviolet radiation with a wavelength in a range from 200 to 250 nm.

2. The method for manufacturing a liquid crystal display as claimed in claim 1, wherein the thickness of each of said polyimide orientation films is in a range from 35 to 70 nm.

3. A liquid crystal display manufactured by the method of claim 2.

4. A liquid crystal display manufactured by the method of claim 1.

5. A method for manufacturing a liquid crystal display, said method comprising:

sequentially, applying a polyimide orientation film having a thickness within a range from 30 to 100 nm on respective opposing surfaces of each of first and second transparent substrates;

orientation-processing said polyimide orientation films using a non-rubbing method; and injecting and sealing a liquid crystal material between said polyimide orientation films to produce a liquid crystal cell; and, thereafter simultaneously heating said liquid crystal cell to a temperature within a range from 90° to 180° C., and irradiating said liquid crystal cell with ultraviolet radiation with a wavelength in a range from 200 to 250 nm.

6. A liquid crystal display manufactured by the method of claim 5.

7. The method for manufacturing a liquid crystal display as claimed in claim 5, wherein the thickness of each of said polyimide orientation films is in a range from 35 to 70 nm.

8. A liquid crystal display manufactured by the method of claim 7.

9. A liquid crystal display manufactured by the method of claim 5.

* * * * *